United States Patent

Üffinger et al.

Patent Number: 5,255,304
Date of Patent: Oct. 19, 1993

[54] DEVICE FOR CENTERING X-RAY FILM CASSETTES

[75] Inventors: Friedrich Üffinger, Schorndorf-Weiler; Hermann Dieterle, Esslingen, both of Fed. Rep. of Germany

[73] Assignee: Eastman Kodak Company, Rochester, N.Y.

[21] Appl. No.: 778,824
[22] PCT Filed: Apr. 15, 1991
[86] PCT No.: PCT/EP91/00719
§ 371 Date: Dec. 20, 1991
§ 102(e) Date: Dec. 20, 1991
[87] PCT Pub. No.: WO91/16665
PCT Pub. Date: Oct. 31, 1991

[30] Foreign Application Priority Data

Apr. 26, 1990 [DE] Fed. Rep. of Germany ....... 4013285

[51] Int. Cl.⁵ .................................................. G03B 42/02
[52] U.S. Cl. ...................................... 378/181; 378/170; 378/187
[58] Field of Search ................ 378/181, 182, 187, 170

[56] References Cited

U.S. PATENT DOCUMENTS

| | | | |
|---|---|---|---|
| 3,150,263 | 9/1964 | Catlin | 378/182 |
| 3,457,406 | 7/1969 | Reiniger | 250/66 |
| 3,826,922 | 7/1974 | Ingles | 250/471 |
| 3,829,698 | 8/1974 | Goetz | 378/181 |
| 4,416,020 | 11/1981 | Wagner et al. | 378/181 |
| 4,426,724 | 1/1984 | Cutter | 378/181 |
| 4,432,095 | 2/1984 | Adelmeyer et al. | 378/181 |
| 4,489,428 | 12/1984 | Schwieker | 378/176 |
| 4,538,293 | 8/1985 | Cutter | 378/181 |
| 4,590,738 | 5/1986 | Hösel et al. | 378/181 |
| 4,675,894 | 6/1987 | Ohlson | 378/181 |
| 4,845,734 | 7/1989 | Maki et al. | 378/181 |
| 4,894,854 | 1/1990 | Guba et al. | 378/181 |
| 4,930,147 | 5/1990 | Dieterlen et al. | 378/176 |
| 4,939,764 | 7/1990 | Markos | 378/181 |
| 5,050,203 | 9/1991 | Mirlieb et al. | 378/182 |

FOREIGN PATENT DOCUMENTS 052159 5/1982 European Pat. Off. .
104419 4/1984 European Pat. Off. .
WO88/09003 11/1988 PCT Int'l Appl. .

Primary Examiner—David P. Porta
Assistant Examiner—Don Wong
Attorney, Agent, or Firm—Frank Pincelli

[57] ABSTRACT

In a cassette loading and unloading apparatus, a device is provided for centering X-ray film cassettes of various sizes, which can be transported on rollers (19), by means of two parallel bars (16, 17) movable towards and away from each other, respectively. The bars (16, 17) have U-shaped recesses (16a, 17a) for passage of rollers (19). Of the lugs of bars (16, 17) formed by the recesses and projecting through the rollers, one lug (16b, 17b) of each bar (16, 17) is slidably guided on a guide rail (14) extending below rollers (19). Moreover, a second lug (16f, 17f) of each bar (16, 17) is in engagement with a driving mechanism (30, 34, 38, 45). The rollers (19), the guide rail (14) and the bars (16, 17) are arranged on the upper side of support plate (10), and the driving mechanism (30, 34, 38, 45) is provided on the lower side of that plate. They jointly form a prefinished assembly unit. FIGS. 1 and 2 are to be published.

12 Claims, 2 Drawing Sheets

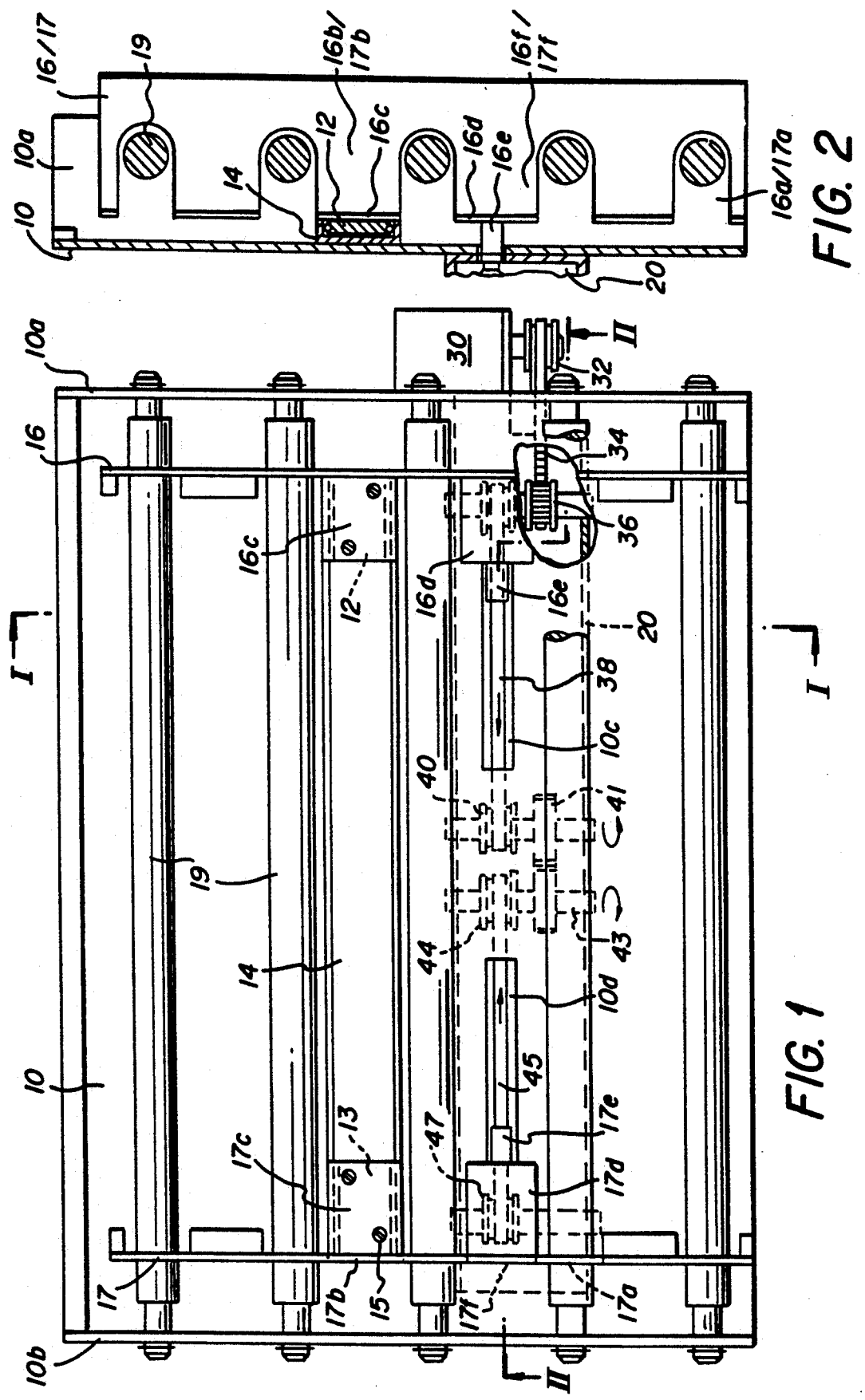

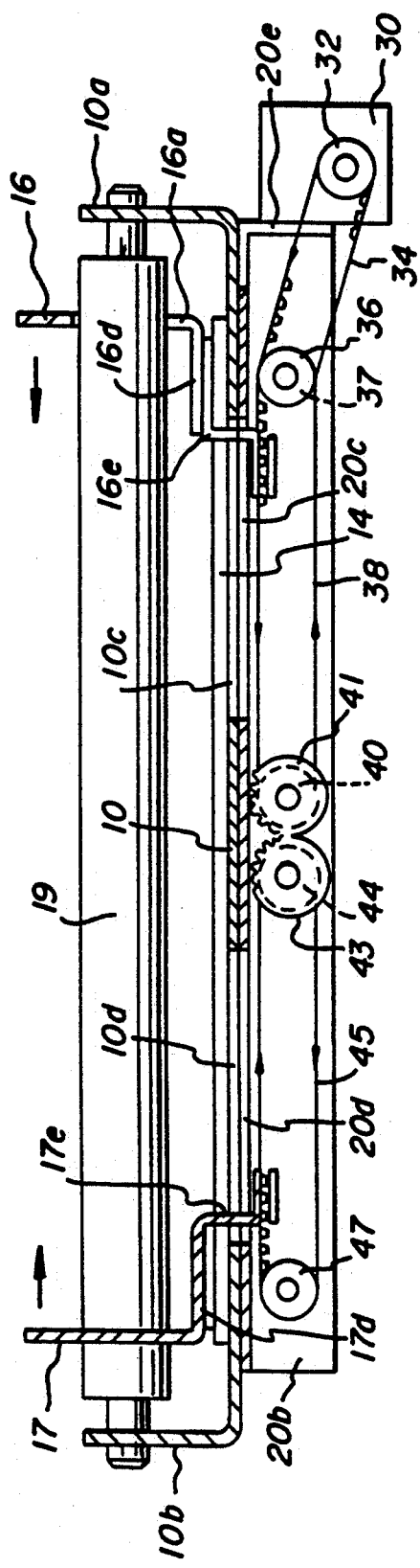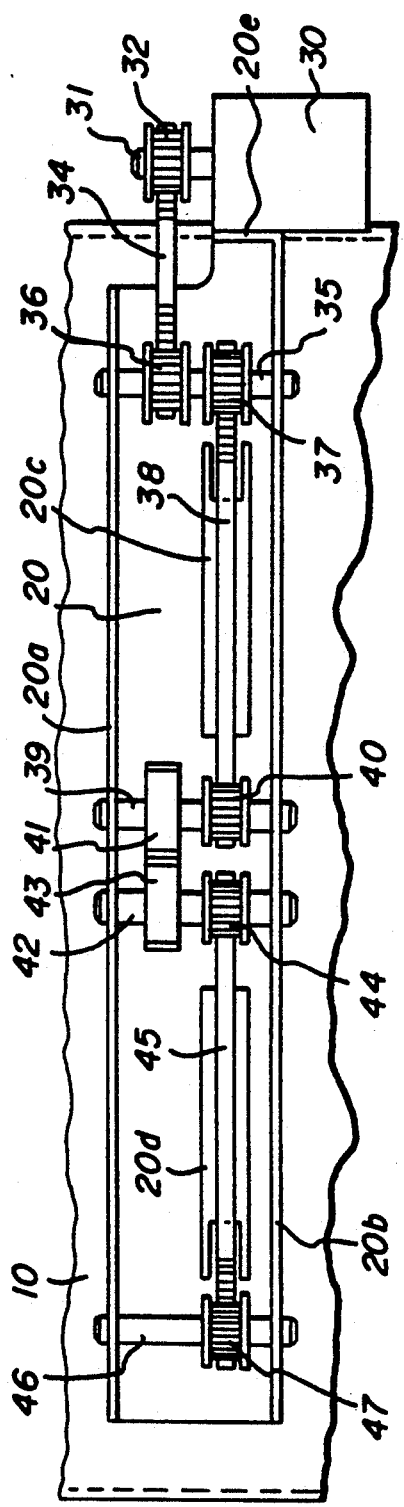

DEVICE FOR CENTERING X-RAY FILM CASSETTES

The invention relates to a device for centering X-ray film cassettes of various sizes, which can be transported on rollers, by means of two parallel bars movable towards and away from each other, respectively, in a cassette loading and unloading apparatus.

From U.S.Pat. No. 3 150 236, a centering device of the above type is known, which comprises a first crank disk pneumatically movable to and fro, and a second crank disk operatively connected to the first disk and rotatable in the opposite direction. Both crank disks are arranged on the housing bottom of the cassette loading and unloading apparatus. Each disk is seated on a spindle mounted in the housing bottom and extending upwardly at right angles. The free ends of the spindles are mounted in projections which are provided on the apparatus and are located at the left and at the right side of the roller arrangement. Each spindle is associated with an abutment ledge arranged above bars which are parallely pivotable above the rollers.

The known centering device is disadvantageous because the pneumatic crank disk is arranged on the housing bottom of the apparatus. Therefore, two very long spindles are required which extend from the bottom up to that part of the cassette loading and unloading station which carries the rollers in order to actuate the device which is arranged above said rollers and moves the bars towards and away from each other. Besides, the spindles which are arranged in the apparatus in an upright position have to be mounted accurately. Moreover, this centering device comprises numerous movable parts so that a lot of time is needed for their assembly. Furthermore, the bars are very thin and short so that large cassettes cannot be guided and centered safely enough.

It is the object of the invention to overcome the aforementioned disadvantages in a centering device for X-ray film cassettes of the above type and to design a compact centering device which can be manufactured easily and operates reliably.

In accordance with the invention, this object is attained in that each of the bars is arranged and designed such that the rollers penetrate them.

In detail, the invention is embodied such that each of the bars has a U-shaped recess for passage of the rollers and that lugs are provided between said recesses, at least one of said lugs resting on a guide rail below the rollers so as to be slidable thereon. Moreover, another lug of each bar is in engagement with a driving mechanism.

In an advantageous modification of the invention, at least the lugs guided on the rail as well as the lugs which are in engagement with the driving mechanism have bent-off portions at their ends.

In a further advantageous modification of the invention, the bent-off portions of the bars are designed on adjacent lugs.

In another advantageous modification, the rollers are horizontally mounted on a support plate.

In yet another advantageous modification, the driving mechanism of both bars is formed by two toothed belts circulating below the rollers in opposite directions.

In a further advantageous modification, the two circulating toothed belts extend horizontally from the center of the support plate towards the bars.

Advantageously, the rollers, the guide rail and the bars are arranged at the upper side of the support plate whereas the driving mechanism is arranged at the lower side of said plate, these parts jointly forming a prefinished assembly unit.

The invention is advantageous in that the prefinished assembly unit requires only relatively little space and is accessible from all sides, can be easily inserted into a cassette loading and unloading apparatus, locked and removed again as a complete unit for repair or cleaning.

Other features and advantages can be inferred from the description of an embodiment illustrated in the drawing, and from the subclaims.

In the drawing FIG. 1 is a plan view of a cassette centering device formed
by two parallel bars movable towards and away from each other. FIG. 2 is a sectional view along line I-I of the centering
device according to FIG. 1, FIG. 3 is a sectional view along line II-II of the centering
device according to FIG. 1, and FIG. 4 is a view from below of that part of the centering
device which is to form the drive.

In an apparatus for unloading exposed film sheets from X-ray film cassettes of various sizes and for loading the cassettes with unexposed film sheets, a device is provided in the area of the unloading and loading station for centering the X-ray film cassettes. This centering device has two bars 16 and 17 which are parallely guided and movable towards and away from each other, respectively.

In the case of the embodiment, five rollers 19 serve for transporting the cassettes. These rollers are arranged in parallel one after the other and are mounted for rotation between two upright side walls 10a and 10b of a support plate 10. The rollers are conventionally driven by a motor.

The bars 16 and 17 have U-shaped recesses 16a and 17a for passage formed between the recesses 16a and 17a and project between the rollers 19 are bent off at their ends.

As can be seen in particular from FIGS. 1 and 2, one lug 16b of the one bar 16 and one lug 17b of the other bar 17 are each mounted so as to slide on a guide rail 14 extending below the third and the fourth roller and being arranged on the upper side of support plate 10. For that purpose, each of the two lugs 16b and 17b has a bent-off portion 16c and 17c, respectively, each of which is mounted by a screw 15 on a shoe 12 shiftable in the guide rail 14.

A driving mechanism is provided in the area below the second and the third roller 19 at the lower side of support plate 10, said mechanism being built into a U-shaped rail 20 and consisting of two toothed belts 38 and 45 driven by a motor 30 and circulating in opposite directions.

As can be seen from FIGS. 3 and 4, the first toothed belt 38 horizontally extends from the center of support plate 10 towards bar 16 whereas the second toothed belt 45 horizontally extends towards bar 17. Both bars 16 and 17 are shown in their initial positions furthest remote from the center of support plate 10. Each toothed belt 38 and 45, respectively, rotates around two toothed pulleys 37, 40 and 44, 47, respectively, which are positioned on four shafts mounted for rotation inside the U-shaped rail 20. The first shaft 35 is arranged in the area of the one free end of rail 20 below bar 16 whereas the fourth shaft 46 is arranged in the area of the other free end of rail 20 below bar 17. The second and third shafts 39 and 42 are located in the central area of rail 20.

Moreover, the free end of the U-shaped rail 20, which is located below bar 16 comprises a bent-off projection 20e to which a motor 30 is connected whose driving shaft 31 holds a toothed pulley 32. A toothed driving belt 34 is guided around the toothed pulley 32 of motor 30 and around another toothed pulley 36 also positioned on the first shaft 35.

Via the toothed driving belt 34, the toothed pulley 32 of motor 30 transmits the rotary movement of the motor 30 and of the driving shaft 31 to the first shaft 35 and, via the toothed belt 38, from said first onto the second shaft 39 which transmits the rotary movement onto the third shaft 42 via gear wheels 41 and 43. As the gear wheels consist of a first wheel 41 seated on the second shaft 39, and of a second wheel 43 seated on the third shaft 42, which wheels are in engagement with each other, shafts 39 and 42 rotate in opposite directions.

As can also be seen from the drawing, support plate 10 has two elongate recesses 10c and 10d as well as two further recesses 20c and 20d which are provided in the U-shaped rail 20 at the lower side of support plate 10 and are congruent with recesses 10c and 10d. An angular holding portion 16e and 17e moulded to each of the bent-off Portions 16d and 17d of bars 16 and 17 projects through each of these recesses. The angular holding portion 16e of bar 16 is in clamping connection with the first toothed belt 38, and the angular holding portion 17e of bar 17 with the second toothed belt 45.

Due to the fact that bars 16 and 17 are movably mounted in a guide rail 14 arranged below rollers 19 and positioned between two rollers, and that they are connected with a belt drive provided below the bars and also situated between two rollers, the cassette centering device can be designed as a flat and compact unit.

We claim:

1. Device for centering X-ray film cassettes of various sizes, which can be transported on rollers, by means of two parallel bars movable towards and away from each other, respectively, in a cassette loading and unloading apparatus, c h a r a c t e r i z e d in that the bars (16 and 17) are arranged and designed such that the rollers (19) penetrate them.

2. Device according to claim 1, characterized in that the rollers (19) are horizontally mounted on a support plate (10).

3. Device according to claim 1, characterized in that each of the bars (16 and 17) has a U-shaped recess (16a and 17a, respectively) for passage of the rollers (19), and in that lugs are provided between said recesses (16a and 17a, respectively), at least one of said lugs (16b and 17b, respectively) resting on a guide rail (14) below the rollers (19) so as to be slidable thereon.

4. Device according to claims 3, characterized in that another lug (16f and 17f, respectively) of each bar (16 and 17) is in engagement with a driving mechanism (30, 34, 38, 45).

5. Device according to claim 4, characterized in that at least one of said lug (16b and 17b) guided on rail (14) as well as the other lugs (16f and 17f) of bars (16 and 17, respectively), which are in engagement with the driving mechanism (30, 34, 38, 45) have bent-off portions (16c, 17c, and 16d, 17d, respectively) at their ends.

6. Device according to claim 5, characterized in that the bentoff portions (16c, 17c and 16d, 17d) of bars (16 and 17, respectively) are designed on adjacent lugs (16b, 16f and 17b, 17f, respectively).

7. Device according to claim 3, characterized in that the driving mechanism of both bars (16 and 17) is formed by two toothed belts (38 and 45, respectively) circulating below rollers (19) in opposite directions.

8. Device according to claims 7, characterized in that the two circulating toothed belts (38 and 45) extend horizontally from the center of a support plate (10) towards the bars (16 and 17, respectively).

9. Device according to claims 8, characterized in that the rollers (19), the guide rail (14) and the bars (16 and 17) are arranged on the upper side of the support plate (10) whereas the driving mechanism (30, 34, 38, 45) is arranged at the lower side thereof, and in that they jointly form a prefinished assembly unit.

10. Device according to claim 8 characterized in that two pairs of congruent, elongate recesses (10c, 10d and 20c, 20d, respectively) are each provided in the support plate (10) and in the U-shaped rail (20).

11. Device according to claim 7, characterized in that the toothed belts (38 and 45, respectively) circulating on toothed pulleys (37, 40 and 44, 47) are arranged in a U-shaped rail (20) provided at the lower side of the support plate (10). pg,9

12. Device according to claim 7, characterized in that the toothed belts (38 and 45) are each in clamping connection with an angular holding portion (16e and 17e, respectively) which is moulded on the bentoff portion (16d and 17d, respectively) of bars (16 and 17, respectively) and projects through the recesses (10c, 10d and 20c, 20d, respectively).

* * * * *